(12) United States Patent
Galtier et al.

(10) Patent No.: US 7,302,835 B2
(45) Date of Patent: Dec. 4, 2007

(54) METHOD AND DEVICE FOR DETERMINING A PHASE POSITION BETWEEN A CRANKSHAFT AND A CAMSHAFT OF AN INTERNAL COMBUSTION ENGINE

(75) Inventors: Frédéric Galtier, Montpellier (FR); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/572,212

(22) PCT Filed: Sep. 3, 2004

(86) PCT No.: PCT/EP2004/052033

§ 371 (c)(1),
(2), (4) Date: Mar. 17, 2006

(87) PCT Pub. No.: WO2005/031124

PCT Pub. Date: Apr. 7, 2005

(65) Prior Publication Data

US 2007/0012096 A1    Jan. 18, 2007

(30) Foreign Application Priority Data

Sep. 26, 2003   (DE) ............................... 103 44 773

(51) Int. Cl.
*G01M 15/00* (2006.01)
(52) U.S. Cl. .................................... 73/117.3
(58) Field of Classification Search .............. 73/116, 73/117.2, 117.3, 118.1
See application file for complete search history.

(56) References Cited

U.S. PATENT DOCUMENTS

| | | | |
|---|---|---|---|
| 4,995,351 A | 2/1991 | Ohkubo et al. | |
| 5,495,830 A | 3/1996 | Wu | |
| 5,635,634 A | 6/1997 | Reuschenbach et al. | |
| 6,598,469 B2 * | 7/2003 | Shimoyama et al. | 73/117.3 |
| 6,681,729 B2 | 1/2004 | Gaessler et al. | |
| 6,804,997 B1 * | 10/2004 | Schwulst | 73/118.2 |
| 2006/0118086 A1 * | 6/2006 | Schwulst et al. | 123/406.47 |

FOREIGN PATENT DOCUMENTS

| | | |
|---|---|---|
| DE | 196 38 010 A1 | 3/1998 |
| DE | 100 64 651 A1 | 7/2002 |
| DE | 101 16 485 A1 | 10/2002 |
| DE | 101 47 835 A1 | 4/2003 |

\* cited by examiner

*Primary Examiner*—Eric S. McCall

(57) ABSTRACT

The invention relates to a method and device for determining a phase position between a crankshaft and a camshaft of an internal combustion engine. An internal combustion engine is provided with a crankshaft, a camshaft, at least one cylinder and an intake tract to which gas inlet valves are assigned that control the gas supply from the intake tract to the one or more cylinders and that are driven via the camshaft. The intake tract is associated with a pressure sensor that detects an intake tube pressure in a manifold of the intake tract. The phase position is determined depending on the intake tube pressure detected. The inventive method and device allows to determine the phase position in a simple manner and without any additional sensor system.

17 Claims, 4 Drawing Sheets

METHOD AND DEVICE FOR DETERMINING A PHASE POSITION BETWEEN A CRANKSHAFT AND A CAMSHAFT OF AN INTERNAL COMBUSTION ENGINE

CROSS REFERENCE TO RELATED APPLICATIONS

This application is the US National Stage of International Application No. PCT/EP2004/052033, filed Sep. 3, 2004 and claims the benefit thereof. The International Application claims the benefits of German Patent application No. 10344773.3 filed Sep. 26, 2003. All of the applications are incorporated by reference herein in their entirety.

FIELD OF THE INVENTION

The invention relates to a method and a device for determining the phase position of a camshaft relative to a crankshaft in an internal combustion engine. Internal combustion engines have a crankshaft which is driven from cylinders in the internal combustion engine by means of pistons and connecting rods linked to them. At the output end, the crankshaft delivers a torque, preferably to a clutch, which is used to drive a vehicle in which the internal combustion engine is located.

BACKGROUND OF THE INVENTION

Internal combustion engines generally have one or more camshafts, which drives/drive gas exchange valves in the internal combustion engine, or possibly a high-pressure pump in a fuel feed device. On the camshaft are cam formations, which bear on the gas exchange valves and thereby determine the time-trace of the valve lift for the gas exchange valves. The camshaft is linked to the crankshaft by means of a transmission, which generally includes gears and a chain.

The phase position of the camshaft relative to the crankshaft has a critical effect on the combustion process in the cylinders of the internal combustion engine, and hence also on the exhaust gases generated by the internal combustion engine. Thus, the quantity of fluid flowing in for each working cycle of a cylinder depends on the phase position of the camshaft relative to the crankshaft. This means that a precise knowledge of the phase position of the camshaft relative to the crankshaft is a prerequisite for a precise determination of the mass of fuel to be dosed into the combustion chambers, and possibly for the selection of the ignition timing.

Internal combustion engines have a crankshaft angle sensor, which detects the angle of the crankshaft. In addition, internal combustion engines regularly have a camshaft angle sensor which detects the angle of the camshaft. From the crankshaft angle which is detected and the camshaft angle which is detected, it is possible to determine the phase position of the internal combustion engine. However, faulty arrangement of the camshaft angle sensor or other camshaft sensor faults can lead to an incorrect determination of the phase position.

DE 196 38 010 A1 discloses a method for determining the angular position of a crankshaft within a working cycle of an internal combustion engine. For this purpose, the output signal from an intake pipe pressure sensor is evaluated during the time when a reference mark on the crankshaft is present. Then, depending on the output signal, an assignment is made indicating whether the crankshaft is within the first rotation of the working cycle concerned or the second. In doing so, use is made of the fact that the time-trace of the intake pipe pressure in the first rotation differs in a characteristic way from its time-traces in the second rotation of the crankshaft.

DE 101 16 485 A1 discloses that it is possible to reconstruct a camshaft signal by computation from the intake pipe pressure detected by a pressure sensor.

U.S. Pat. No. 5,495,830 A discloses, for an internal combustion engine with variable phase positioning, a method for determining the phase position of the inlet valve relative to a piston, by reference to a crankshaft angle. This determines the point in time at which the piston is positioned at a prescribed crankshaft angle, so that there is a known air intake volume in the cylinder. At this point in time, the pressure in an air induction pipe, between the intake valve and a throttle valve, is determined. Further, while the inlet valve is closed, the pressure in the induction pipe is determined. The phase position of the inlet valve is determined from a predefined characteristic line, as a function of the pressure determined.

DE 101 47 835 A1 discloses a method for determining the effective valve lift curves for an internal combustion engine. This involves calculating a time-trace of the cylinder pressure synthetically, on the basis of prescribed values for the time-point of opening, the valve lift travel and the maximum valve lift for the valve, starting from the measured pressure value at the point in time when the exhaust valve opens. The synthetically calculated time-trace of the cylinder pressure is then compared with a measured time-trace of the cylinder pressure based on the cylinder pressure, the exhaust gas pressure and the intake pressure. The time-trace of the valve lift for which the difference is a minimum is determined by systematic changes to the prescribed values for the synthetically calculated time-trace of the valve lift, and by repeating the comparison between the measured time-trace of the cylinder pressure and the calculated time-trace.

Ever more stringent legal regulations on emissions make it necessary to detect the phase position of the camshaft relative to the crankshaft reliably and precisely.

SUMMARY OF THE INVENTION

An object of the invention is to propose a simple method and device for determining the phase position of the camshaft relative to the crankshaft in an internal combustion engine.

This object is achieved by the characteristics of the patent claims. Advantageous embodiments of the invention are characterized in the sub-claims.

An internal combustion engine has a crankshaft, a camshaft, at least one cylinder and an induction pipe, associated with which is at least one gas intake valve which controls the supply of gas from the induction pipe into the cylinder or cylinders and which is actuated via the camshaft. The induction pipe has an associated pressure sensor, which detects the pressure in an intake pipe in a manifold on the induction piping.

The invention is based on the recognition that after a gas inlet valve has opened the pressure in the intake pipe drops, or after the gas inlet valve has closed the pressure in the intake pipe rises. The invention is distinguished by the fact that a correction value is determined as a function of a load variable and the rotational speed and the phase position is determined as a function of the detected pressure in the intake pipe and the correction value.

This has the advantage that an intake pipe pressure sensor, which would in any case normally be present, can be used. In this way it is also possible, if appropriate, to do without a separate camshaft angle sensor, which is advantageous for the internal combustion engine from the point of view of costs. Furthermore, the phase position thus determined can be tested for plausibility against a phase position which is determined as a function of the camshaft angle, detected by the camshaft angle sensor. In this way it is then possible very quickly to recognize camshaft angle sensor faults and to initiate appropriate emergency operating measures in the internal combustion engine.

The correction value can be used to take into account in a simple way the fact that an analysis of the intake pipe pressure identifies a different point in the time-trace of the lift for the gas valve concerned, depending on the load point concerned for the internal combustion engine.

In an advantageous embodiment of the invention, the phase position is determined as a function of a crankshaft angle at which the intake pipe pressure rises above or falls below a threshold value for the intake pipe pressure. This procedure has the advantage that it is particularly simple.

In a further advantageous embodiment of the invention, the phase position is determined as a function of a crankshaft angle at which the derivative with respect to time of the intake pipe pressure rises above or falls below a threshold value for the derivative with respect to time of the intake pipe pressure. This has the advantage that the phase position can be precisely determined.

In a further advantageous embodiment of the invention, the phase position is determined as a function of a crankshaft angle at which a turning point is reached in the derivative with respect to time of the intake pipe pressure. This has the advantage that the phase position can be precisely determined.

In a further advantageous embodiment of the invention, the turning point is a minimum. This has the advantage that a minimum of the derivative with respect to time of the intake pipe pressure is characteristic of an upward travel of the gas inlet valve, and in particular of the start of the gas inlet valve lift.

In a further advantageous embodiment of the invention, the turning point is a maximum. This has the advantage that a maximum of the derivative with respect to time of the intake pipe pressure is characteristic of an downward travel of the gas inlet valve, and in particular of the end of the gas inlet valve lift.

In a further advantageous embodiment of the invention, the phase position is only determined within a prescribed crankshaft angle range. This has the advantage that the method can be carried out with little computational effort.

As the load variable, it is advantageous to select the intake pipe pressure or the air mass flow.

In a further advantageous form of the invention, the correction value is determined in addition as a function of the inducted air temperature. This makes it possible to take into account effects due to the temperature of the inducted air on the measurement signal from the intake pipe pressure sensor which can, for example, manifest themselves as a drift in the sensor signal or a changed sensitivity of the intake pipe pressure sensor.

BRIEF DESCRIPTION OF THE DRAWINGS

Exemplary embodiments of the invention are explained below by reference to the schematic drawings. These show.

Elements which have the same design and function are identified by the same reference marks in all the figures.

DETAILED DESCRIPTION OF THE INVENTION

Figure 1:
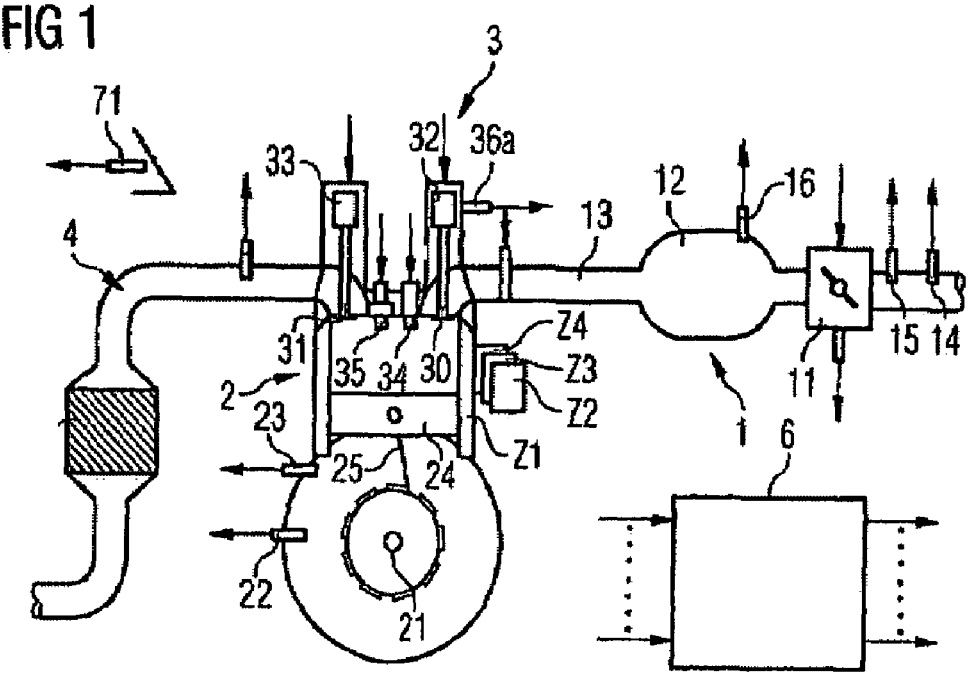
FIG. 1 an internal combustion engine with a control device in which the phase position of a camshaft relative to a crankshaft FIG. 2 a further view of parts of the internal combustion engine as shown in FIG. 1, FIG. 3 a flow diagram of a program for determining the phase position, FIG. 4 a further flow diagram of another program for determining the phase position, and FIG. 5 an example of the time-trace of the intake pipe pressure MAP and the time-trace of the lift of the gas exchange valves.

An internal combustion engine (FIG. 1) includes an induction pipe 1, an engine block 2, a cylinder head 3 and an exhaust gas pipe 4. The induction pipe will preferably incorporate a throttle valve 11, in addition a manifold 12 and an intake pipe 13 which feeds to a cylinder Z1 via an inlet channel in the engine block. The engine block incorporates in addition a crankshaft 21 which is coupled to the piston 24 in the cylinder Z1 via a connecting rod 25.

Figure 2:
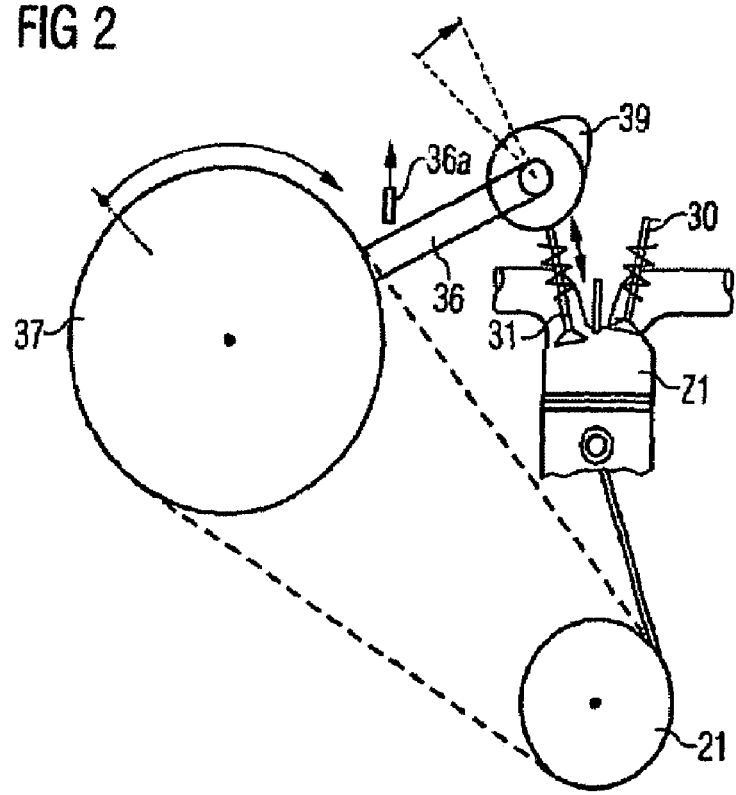

The cylinder head incorporates a valve mechanism with an inlet valve 30, an exhaust valve 31 and valve actuators 32, 33. Here, actuation of the gas inlet valve 30 and the gas exhaust valve 31 is effected by means of a camshaft 36 (see FIG. 2), on which are formed cams 39, which bear on the gas inlet valve 30 or the gas exhaust valve 31 respectively, or possibly by means of a pair of camshafts, one of which is associated respectively with the gas inlet valve 30 and one with the gas exhaust valve 31.

The drive for the gas inlet valve 30 and/or the gas exhaust valve 31 will preferably incorporate not only the camshaft 36 but also an adjustment device 37, linked on the one hand with the camshaft 36 and on the other hand with the crankshaft 21, e.g. via ring gears which are linked together via a chain. By means of the adjustment device 37, the phase of the camshaft 36 relative to the crankshaft 21 can be adjusted. The arrangement of the ring gears and the chain forms a transmission.

The cylinder head 3 (FIG. 1) incorporates in addition an injection valve 34 and a spark plug 35. Alternatively, the injection valve can also be arranged in the induction channel.

Also provided is a control device 6, which has associated sensors to detect various measurable quantities and each of which determines the measured value of the measurable quantity. The control device 6 determines manipulated variables, as a function of at least one of the measurable quantities, which are then converted into one or more actuating signals for controlling the actuators by means of appropriate actuator drives.

The sensors are: a pedal position sensor 71 which detects the setting of a drive pedal, an air mass meter 14 which detects an air mass flow MAF upstream from the throttle valve 11, a temperature sensor 15 which detects the inducted air temperature T_IM, a pressure sensor 16 which detects the intake pipe pressure MAP, a crankshaft angle sensor 22 which detects a crankshaft angle CRK and determines a rotational speed N for the crankshaft as a function of the detected crankshaft angle CRK, another temperature sensor 23 which detects a temperature of the coolant, and a camshaft angle sensor 36a which detects the camshaft angle CAM. Depending on the form of embodiment of the invention, any desired subset of the sensors may be present, and also additional sensors.

The actuators are, for example, the throttle valve 11, the gas inlet and gas exhaust valves 30, 31, the injection valve 34, the spark plug 35 and the adjustment device 37.

Apart from the cylinder Z1 which is shown in detail, there are generally further cylinders Z2 to Z4 present in an internal combustion engine, associated with which are then corresponding intake pipes, exhaust channels and actuators.

The control device incorporates a phase position unit in which the phase position of the camshaft 36 relative to the crankshaft 21 is determined. For this purpose a program is stored in the control device, and is executed during the operation of the internal combustion engine.

The program (FIG. 3) is started in a step S1, in which any necessary variables are initialized.

Step S2 checks whether the crankshaft angle CRK is equal to a first crankshaft angle CRK1. If not, the program pauses in step S3 for a predefined waiting time T_W before checking the condition in step S2 again.

On the other hand, if the condition in step S2 is satisfied then step S4 checks whether the crankshaft angle CRK is less than a second crankshaft angle CRK2. If not, the program pauses in step S3 for the predefined waiting time T_W. On the other hand, if the conditions in steps S2 and S4 are satisfied then the crankshaft is within the range, predefined by the first crankshaft angle CRK1 and the second crankshaft angle CRK2, which is preferably chosen such that the characteristic lift point which is to be determined for the gas inlet valve 30 lies within this range of crankshaft angles.

Step S5 then determines the derivative with respect to time of the intake pipe pressure, DT_MAP, preferably across the range of crankshaft angles predefined by the first crankshaft angle CRK1 and the second crankshaft angle CRK2.

Step S6 then determines the minimum DT_MAP_MIN of the derivative with respect to time of the intake pipe pressure DT_MAP.

In step S7 the crankshaft angle CRK, at which the derivative with respect to time DT_MAP of the intake pipe pressure adopted the minimum of DT_MAP_MIN, is assigned to a crankshaft angle CRK_MAP which is a function of the intake pipe pressure.

In step S9, the phase position PH_MAP is determined as a function of the crankshaft angle CRK_MAP, which is a function of the intake pipe pressure, a reference crankshaft angle CRK_REF and a reference phase position PH_REF. The reference crankshaft angle CRK_REF is preferably permanently predefined and can be set, for example, as the start of a first tooth following a gap on the crankshaft angle sensor.

The reference phase position PH_REF is the phase position of the camshaft 36 relative to the crankshaft 21 which is adopted under predefined reference conditions, such as for example a predefined installation position of the camshaft 36 relative to the crankshaft 21, for example during the final testing of the internal combustion engine after its manufacture.

The program terminates in a step S11.

It is preferable that after step S7 a step S16 is executed, in which a correction value COR is determined as a function of the rotational speed N and a load variable such as, preferably, the air mass flow MAF or the intake pipe pressure MAP and if appropriate the inducted air temperature T_IM. Using the correction value COR it is possible to take into account the fact that, depending on the relevant load point at which the internal combustion engine is being operated, the crankshaft angle CRK_MAP, which is a function of the intake pipe pressure, is characteristic of various points on the time-trace of the gas intake valve's lift. So, for example, under light load the crankshaft angle CRK_MAP as a function of the intake pipe pressure is characteristic of the start of the lift for the gas intake valve 30, while under heavy loads it characterizes the maximum of the lift for the gas intake valve. Here, the correction value COR will preferably be determined by means of characteristic array interpolation, from a characteristic array determined beforehand by tests or simulations of the internal combustion engine. Step 17 which then follows corresponds to step S9, with the addition that in it the phase position PH_MAP is determined as a function also of the correction value COR.

As an alternative to steps S6 and S7, the steps S13 and S14 can also be executed. in step S13, a maximum DT_MAP_MAX of the derivative with respect to time DT_MAP of the intake pipe pressure is determined as a function of the derivative with respect to time of the intake pipe pressure, DT_MAP. Step S14 then determines the crankshaft angle CRK_MAP, which is a function of the intake pipe pressure, as a function of the crankshaft angle CRK which is assigned to the maximum DT_MAP_MAX of the derivative with respect to time of the intake pipe pressure.

Figure 3:
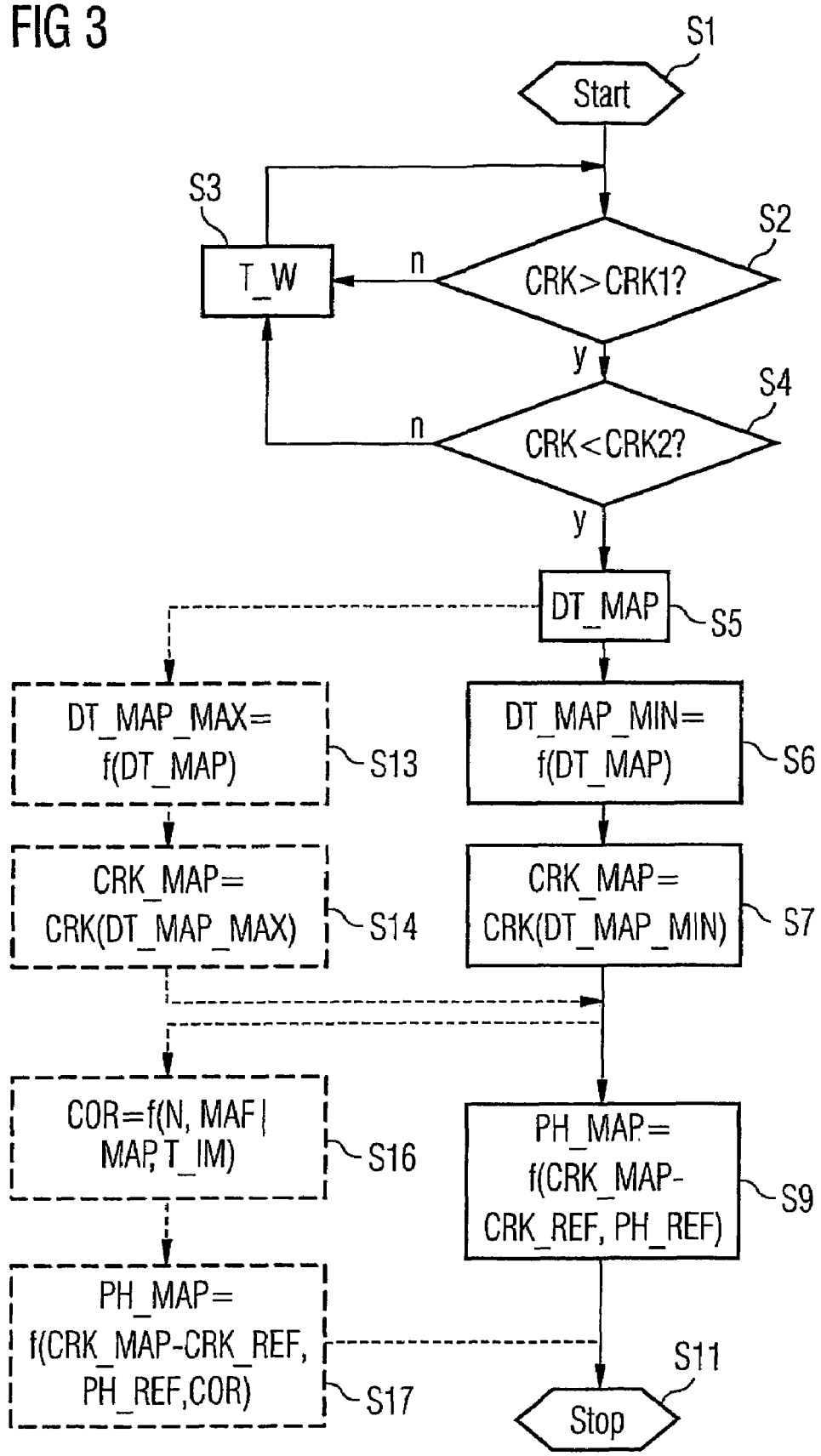
Figure 4:
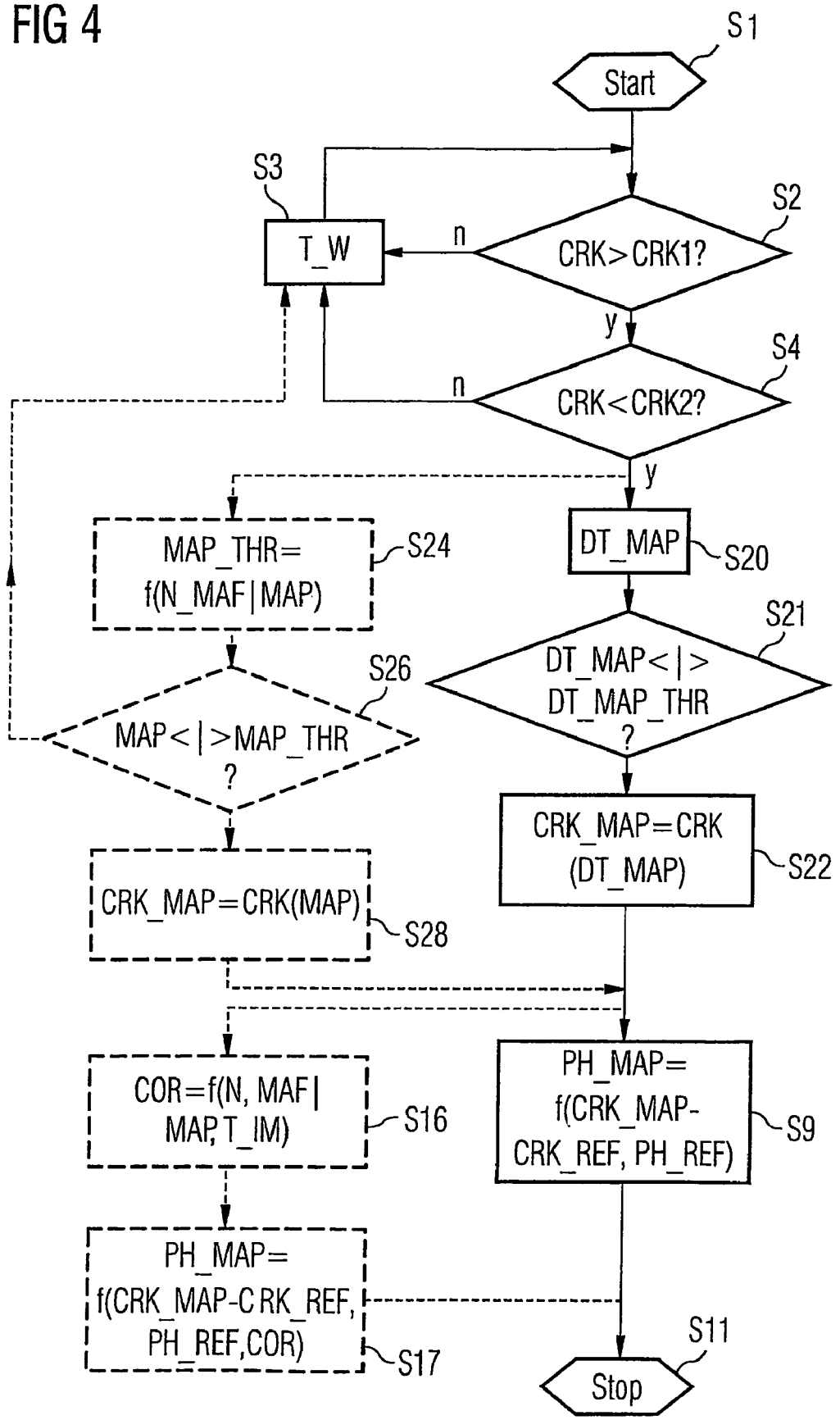

A further alternative form of embodiment of a program for determining the phase position PH_MAP is described below by reference to the flow diagram shown in FIG. 4. If the condition in step 4 (see also FIG. 3) is satisfied, then step S20 determines the derivative with respect to time DT_MAP of the intake pipe pressure.

Step S21 checks whether the current derivative with respect to time of the intake pipe pressure, DT_MAP is greater than a prescribed threshold value DT_MAP_THR for the derivative with respect to time of the intake pipe pressure. Alternatively, step S21 can also check whether the derivative with respect to time of the intake pipe pressure, DT_MAP is less than the threshold value DT_MAP_THR. Which of the conditions is checked will depend on whether it is the start of the lift or the end of the lift for the gas intake valve which is to be detected.

If the condition in step S21 is not satisfied, the program pauses in step S3 for the prescribed waiting time T_W. On the other hand, if the condition in step S21 is satisfied, then in step S22 the crankshaft angle CRK, which is associated with the current derivative with respect to time DT_MAP of the intake pipe pressure, is assigned to a crankshaft angle CRK_MAP which is a function of the intake pipe pressure. Following this, step S9 or steps S16 and S17 are executed, as shown in FIG. 3.

As an alternative to steps S20, S21 and S22, it is also possible to execute steps S24, S26 and S28. In step S24, a threshold value MAP_THR is determined for the intake pipe pressure, preferably by means of characteristic array interpolation, as a function of the rotational speed N and a load variable, which will preferably be the air mass flow or the intake pipe pressure MAP.

Step S26 then checks either whether the current intake pipe pressure MAP is less than the threshold value MAP_THR for the intake pipe pressure, or whether it is greater than the threshold value MAP_THR for the intake pipe pressure. Which of the conditions is checked in step S26 depends, in a way corresponding to step S21, on whether it is the start of the lift for the gas intake valve 30 or the end of the lift for the gas intake valve 30 which is to be detected. If the condition in step S26 is not satisfied, then the program pauses in step S3 for the prescribed waiting time T_W.

If the condition in step S26 is satisfied, then in step S28 the crankshaft angle CRK, which is associated with the current intake pipe pressure MAP, is assigned to a crankshaft angle CRK_MAP which is a function of the intake pipe pressure.

Figure 5:
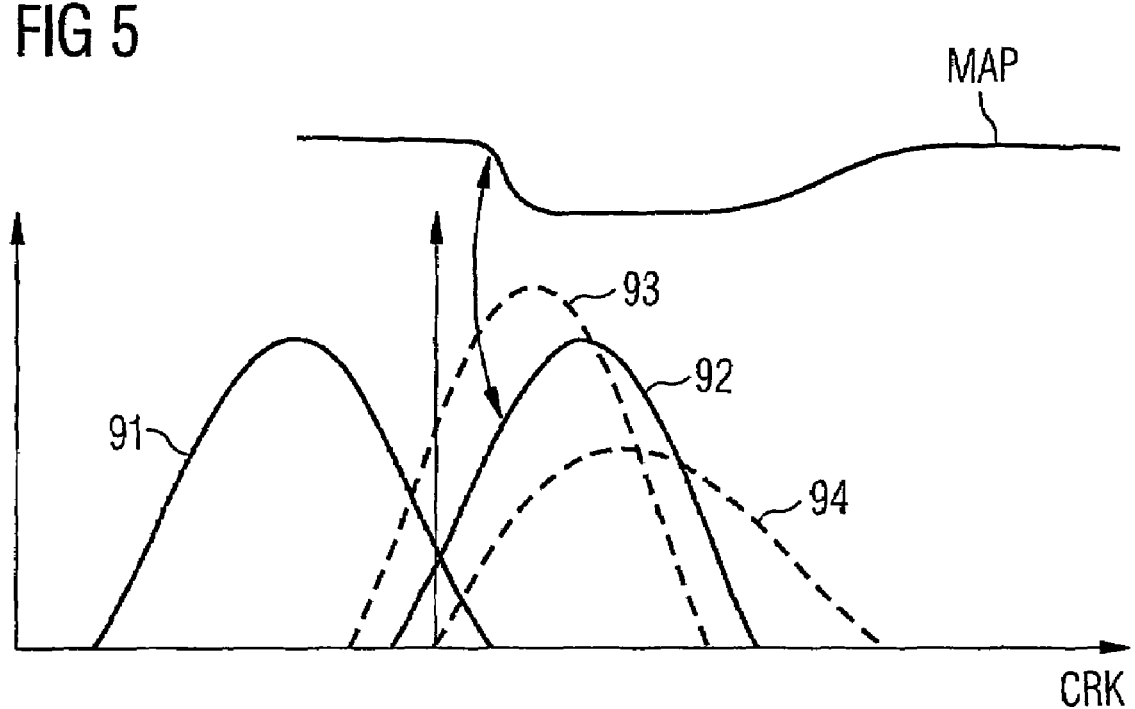

FIG. 5 shows the time-trace of the intake pipe pressure MAP and the time-trace 91 of the lift of the gas exhaust valve 31 and the time-trace 92 of the lift of the gas intake valve 30. Also show are possible time-traces 93, 94 for the gas intake valve 31 which could result from corresponding manufacturing tolerances or changes to the arrangement of the internal combustion engine.

The invention claimed is:

1. A method for determining the phase position of a crankshaft relative to a camshaft in an internal combustion engine, comprising:
    detecting an induction pipe pressure in a manifold within an induction pipe of the engine;
    determining a correction value as a function of a load variable and a rotational speed of the engine; and
    determining the phase position of the crankshaft as a function of the intake pipe pressure and the correction value.

2. The method as claimed in claim 1, wherein the phase position is determined as a function of the crankshaft angle at which the intake pipe pressure rises above or falls below a predetermined threshold value.

3. The method as claimed in claim 1, wherein the phase position is determined as a function of the crankshaft angle at which the derivative with respect to time of the intake pipe pressure rises above or falls below a predetermined threshold value for a derivative with respect to time of the intake pipe pressure.

4. The method as claimed in claim 1, wherein the phase position is only determined within a predefined range of crankshaft angles.

5. The method as claimed in claim 1, wherein the load variable is the intake pipe pressure or an air mass flow in the engine.

6. The method as claimed in claim 1, wherein the correction value is determined by a characteristic array interpolation method.

7. The method as claimed in claim 1, wherein the correction value is determined as a function of the inducted air temperature.

8. The method as claimed in claim 1, wherein the phase position is determined as a function of the crankshaft angle at which the derivative with respect to time of the intake pipe pressure reaches an inflection point.

9. The method as claimed in claim 8, wherein the inflection point is a maximum or a minimum intake pipe pressure.

10. A camshaft phase position device, comprising:
    a pressure sensor arranged in an induction pipe of an internal combustion engine that detects an induction pipe pressure in a manifold of the induction pipe; and
    a control device that:
    determines a correction value as a function of a load variable and a rotational speed of the engine, and
    determines the phase position of a camshaft as a function of the intake pipe pressure and the correction value.

11. An internal combustion engine, comprising:
    an engine block containing a crankshaft and a cylinder;
    a cylinder head arranged on the engine block opposite the crankshaft to form an end of the cylinder;
    a piston arranged within the cylinder;
    a connecting rod that connects the piston to the crankshaft;
    an induction pipe connected to the cylinder head via an induction gas valve;
    an induction pipe pressure sensor that detects an induction pipe pressure in a manifold of the induction pipe;
    a control device that:
    determines a correction value as a function of a load variable and a rotational speed of the engine, and
    determines the phase position of a camshaft as a function of the intake pipe pressure and the correction value.

12. The engine as claimed in claim 11, wherein the phase position is determined as a function of the crankshaft angle at which the intake pipe pressure rises above or falls below a predetermined threshold value.

13. The engine as claimed in claim 11, wherein the phase position is determined as a function of the crankshaft angle at which the derivative with respect to time of the intake pipe pressure rises above or falls below a predetermined threshold value for a derivative with respect to time of the intake pipe pressure.

14. The engine as claimed in claim 11, wherein the load variable is the intake pipe pressure or an air mass flow in the engine.

15. The engine as claimed in claim 11, wherein the correction value is determined as a function of the inducted air temperature.

16. The engine as claimed in claim 11, wherein the phase position is determined as a function of the crankshaft angle at which the derivative with respect to time of the intake pipe pressure reaches an inflection point.

17. The engine as claimed in claim 16, wherein the inflection point is a maximum or a minimum.

* * * * *